(12) United States Patent
Lewis et al.

(10) Patent No.: US 8,781,246 B2
(45) Date of Patent: Jul. 15, 2014

(54) IMAGE ENHANCEMENT

(75) Inventors: Edward Lloyd Lewis, Maidstone (GB); Jeremy Lynn Hinton, Bristol (GB)

(73) Assignee: BAE Systems plc, London (GB)

( * ) Notice: Subject to any disclaimer, the term of this patent is extended or adjusted under 35 U.S.C. 154(b) by 104 days.

(21) Appl. No.: 13/518,654

(22) PCT Filed: Dec. 23, 2010

(86) PCT No.: PCT/GB2010/052204
§ 371 (c)(1),
(2), (4) Date: Jun. 22, 2012

(87) PCT Pub. No.: WO2011/077164
PCT Pub. Date: Jun. 30, 2011

(65) Prior Publication Data
US 2012/0275721 A1 Nov. 1, 2012

(30) Foreign Application Priority Data

Dec. 24, 2009 (EP) ..................................... 09275133
Dec. 24, 2009 (GB) ................................... 0922533.5

(51) Int. Cl.
*G06K 9/40* (2006.01)
*G06K 9/36* (2006.01)
*G06T 5/00* (2006.01)

(52) U.S. Cl.
USPC ........................... 382/266; 382/284; 358/3.27

(58) Field of Classification Search
CPC ....................................................... G06T 5/003
See application file for complete search history.

(56) References Cited

U.S. PATENT DOCUMENTS

| 4,853,970 | A  | * | 8/1989  | Ott et al. ........................ 382/266 |
| 4,906,940 | A  |   | 3/1990  | Greene et al. |
| 5,974,189 | A  | * | 10/1999 | Nicponski ....................... 382/254 |
| 6,300,955 | B1 |   | 10/2001 | Zamir |
| 6,611,618 | B1 |   | 8/2003  | Peli |
| 7,082,211 | B2 | * | 7/2006  | Simon et al. ................... 382/118 |
| 7,359,562 | B2 | * | 4/2008  | Raskar et al. .................. 382/254 |
| 7,406,208 | B2 | * | 7/2008  | Chiang ........................... 382/266 |
| 7,433,535 | B2 | * | 10/2008 | Mukherjee ..................... 382/266 |
| 7,738,723 | B2 | * | 6/2010  | Ehrlich et al. ................. 382/254 |

(Continued)

FOREIGN PATENT DOCUMENTS

| EP | 1 530 156 A1 | 5/2005 |
| EP | 1 847 955 A1 | 10/2007 |

(Continued)

OTHER PUBLICATIONS

International Preliminary Report on Patentability and Written Opinion, dated Jul. 5, 2012 from related International Application No. PCT/GB2010/052204.

(Continued)

*Primary Examiner* — Kanjibhai Patel
(74) *Attorney, Agent, or Firm* — Scully, Scott, Murphy & Presser, PC

(57) ABSTRACT

A method and system are disclosed for enhancing the visibility of features of an image. The method comprises the steps of acquiring image data corresponding to at least one image feature using sensing means; processing the image data to identify changes in adjacent data points corresponding to a boundary of the at least one image feature; and, generating modified image data corresponding to the processed image data.

17 Claims, 4 Drawing Sheets

(56) References Cited

U.S. PATENT DOCUMENTS

| | | | |
|---|---|---|---|
| 8,350,951 B2 * | 1/2013 | Terasawa | 348/335 |
| 8,554,005 B1 * | 10/2013 | Majewicz | 382/266 |
| 2002/0130953 A1 * | 9/2002 | Riconda et al. | 348/115 |
| 2004/0183925 A1 | 9/2004 | Raskar et al. | |
| 2005/0099433 A1 | 5/2005 | Berson et al. | |
| 2008/0068400 A1 | 3/2008 | John et al. | |

FOREIGN PATENT DOCUMENTS

| | | |
|---|---|---|
| EP | 2 034 443 A1 | 3/2009 |
| JP | 2000-19259 | 1/2000 |
| JP | 2005-339173 | 12/2005 |
| WO | WO 94/17493 | 8/1994 |
| WO | WO 99/26199 | 5/1999 |
| WO | WO 02/089043 A1 | 11/2002 |

OTHER PUBLICATIONS

International Search Report dated Oct. 31, 2011 issued in PCT/GB2010/052204.

Extended European Search Report dated Jun. 10, 2010 issued in EP 09275133.8.

UK Search Report dated Mar. 3, 2010 issued in GB0922533.5.

* cited by examiner (a) (b) (c)

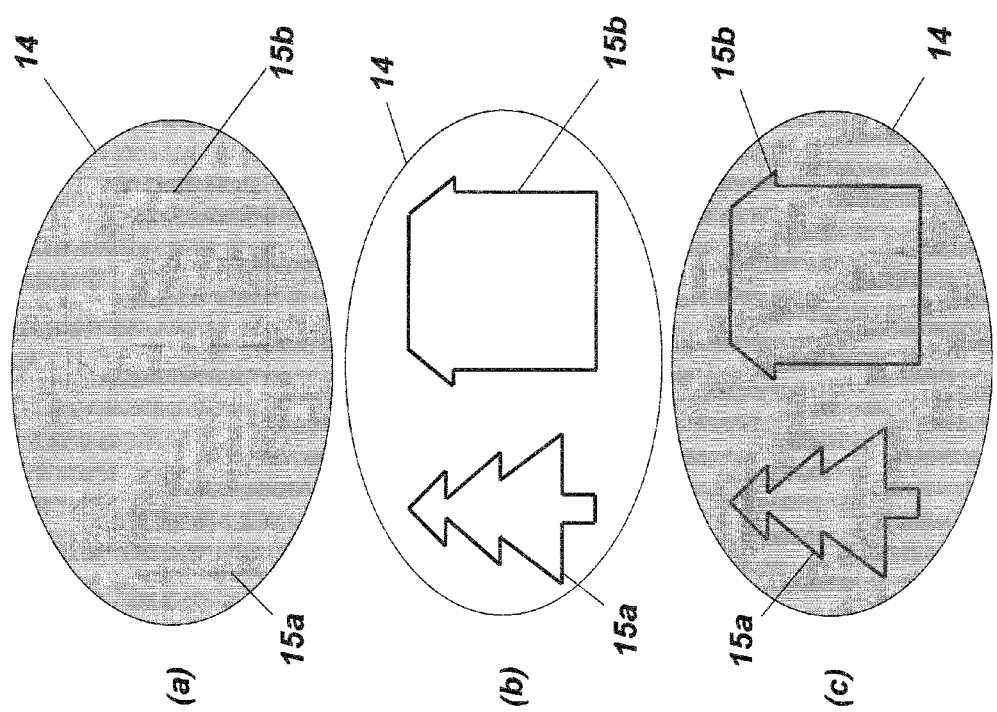

IMAGE ENHANCEMENT

The present invention relates to a method of enhancing the visibility of at least one feature of an image superimposed on a real world scene containing the feature.

A head-up display (HUD) is any transparent display which presents data to a user, without requiring the user to look away from his or her usual viewpoint. The display is typically rigidly mounted upon a chassis of an aircraft cockpit, for example, such that a pilot can view the displayed image and the outside scene simultaneously. When the display is mounted upon a users head or helmet, such that the display extends in front of one or both of the users eyes, the display is often referred to as a helmet or head mounted display (HMD). The HMD offers the advantage that the displayed image remains visible to the user regardless of the users viewing direction.

Displaying images from a sensor such as a camera, infrared camera or radar, on a HUD or HMD can help a pilot under difficult external visual conditions. However, greyscale images which are bright enough to be viewed on a HUD or HMD can obscure the outside scene detracting from the usefulness of the system particularly if the pilot must be able to see the ground before committing to landing an aircraft.

The human eye requires a dynamic range in luminance of approximately 100:1 to render a good quality image. The lowest visible grey level in a HUD or HMD, as established from conventional operation of HUD and HMD, is approximately 20% of the background luminance. Therefore, if the maximum specified ambient background luminance is 10,000 ft-L (foot-Lambert), then the minimum grey level must not be less than 200 ft-L. Consequently, to provide the full dynamic range necessary for a pilot to suitably discriminate features of an image, the brightest display level is required to be approximately 20,000 ft-L, which added to the background of 10,000 ft-L makes a total of 30,000 ft-L, which is too bright for the pilot to perform his visual tasks. It has been demonstrated that a luminance of 15,000 ft-L, although not damaging, is uncomfortable even for an adapted eye. It is a requirement therefore, that the peak display brightness should be limited to a level comfortable to the eye if it is to be acceptable to the pilot.

A tentative maximum value of 3,500 ft-L has been suggested, which added to the maximum from the background scene gives a combined peak luminance value of 13,500 ft-L. However, the minimum black display level (based upon a 100:1 range) will be only 35 ft-L, which is less than 20% of the background luminance and so will provide insufficient black level contrast against a bright ambient. Therefore, there is a problem operating a display with a good greyscale rendition under high background luminance.

Evidence for this is given in FIG. 1 of the drawings which illustrates how the luminance range for good acuity changes with the light adaptation of the human eye. For example, the useful luminance range is shown to extend over five decades (0.01-1000 ft-L) for an eye adaptation level of 0.1 ft-L (Log $L_a$=-1), namely low background luminance, but reduces to two decades (100-10,000 ft-L) for an eye adaptation level of 10,000 ft-L (Log $L_a$=4), namely high background luminance. Accordingly, it is difficult to render features of an image visible on a display under high background luminance, since there is an insufficient useful luminance range.

We have now devised a method and system for enhancing the visibility of features of an image.

In accordance with the present invention as seen from a first aspect, there is provided a method of enhancing the visibility of at least one feature of an image superimposed on a real world scene containing said feature, the method comprising: acquiring image data of said real world scene including said at least one feature using sensing means; processing the image data to identify changes in adjacent data points corresponding to a boundary of the at least one image feature; generating modified image data corresponding to the boundary of the at least one image feature; and displaying in real time an outline image corresponding to the modified image data superimposed on the boundary of said at least one feature in the real world scene.

The luminance of the outline image is preferably generally equal to or greater than the luminance of the real world scene, and more preferably within 20% of the luminance of the real world scene.

The method may include generating enhanced image data of the at least one feature in the real world scene and displaying on said head-up display an enhanced image of the at least one feature corresponding to the enhanced image data combined with the outline image. Preferably, the luminance of the outline image is greater than the luminance of the enhanced image. The method may also include modifying the luminance of the enhanced image dependent on the luminance of the real world scene.

The method may include displaying the outline image on a head-up display superimposed on the real world scene viewed through the head-up display. Alternatively, the real world scene may be displayed on a display with the outline image superimposed on the image of the real world scene.

The method may include acquiring image data of said real world scene for generating said outline image using sensing means which senses radiation at a wavelength not in the visible spectrum.

The method may comprise acquiring image data of said real world scene for generating the outline image using a first sensing means, and acquiring image data of said real world scene for generating the enhanced image using a second different sensing means.

The present invention also provides a system for enhancing the visibility of at least one feature of an image superimposed on a real world scene containing said feature, the system comprising image sensing means for acquiring image data corresponding to the at least one image feature, processing means for processing the image data to generate modified data comprising data corresponding to a boundary of the at least one image feature, and a display for displaying in real time an outline image corresponding to the modified image data superimposed on the boundary of the at least one image feature.

The display may be configured to display the outline image at a luminance which is generally equal to or greater than the luminance of the real world scene.

The system may comprise sensing means for sensing the luminance of the real world scene and adjusting the luminance of the outline image in response thereto The sensing means may be configured for generating enhanced image data of the at least one feature in the real world scene for displaying on said display an enhanced image of the at least one feature corresponding to the enhanced image data combined with the outline image. Preferably, the luminance of the outline image displayed is greater than the luminance of the enhanced image displayed. Means may be provided operable by a viewer for modifying the luminance of the enhanced image and/or the outline image according to the luminance of the real world scene.

The system may comprise a head-up display configured for displaying the outline image superimposed on the real world scene viewed through the head-up display. Alternatively, the display may be configured for displaying the real world scene with the outline image superimposed on the image of the real world scene.

The sensing means may sense radiation at a wavelength not in the visible spectrum for acquiring image data of said real world scene for generating said outline image.

A first sensing means may be provided for acquiring image data of said real world scene for generating the outline image, and a second different sensing means for acquiring image data of said real world scene for generating the enhanced image.

The method of the present invention thus reduces the sensor image to a set of key features such as edges of image features. This enables an outline of the image features to be displayed without obscuring the direct view through a HUD or a HMD of the outside scene.

Preferably, the method further comprises generating a modified image of the at least one image feature using the modified image data. The modified image preferably comprises the at least one image feature illustrated in outline.

The method preferably further comprises combining the modified image data with the image data to generate enhanced image data.

Preferably, the method further comprises generating an enhanced display of said image using the enhanced image data. Preferably, the enhanced display comprises the at least one image feature illustrated in outline, superimposed over the at least one image feature.

In an alternative embodiment, the acquisition of image data preferably comprises acquiring first image data of the at least one image feature using first sensing means and acquiring second image data of the at least one image feature using second sensing means.

Preferably, the method further comprises processing one of the first or second image data to identify changes in adjacent data points corresponding to a boundary of the at least one image feature. The method further comprises generating modified first or second image data corresponding to the processed first or second image data.

The modified first or second image data preferably comprises data corresponding to an outline of the at least one image feature.

Preferably, the method further comprises combining the modified first or second image data with the unprocessed second or first image data, respectively, to generate enhanced image data.

The method preferably comprises generating an enhanced display of the image using the enhanced image data. Preferably, the enhanced image comprises an outline of the at least one image feature corresponding to the modified first or second image data superimposed on the at least one image feature corresponding to the second or first image data, respectively.

The processing of the image data, or the first or second image data, preferably comprises the application of a filter, and more preferably, a convolution filter to the image data, or the first or second image data.

In accordance with the present invention as seen from a second aspect, there is provided a method of enhancing the visibility of features of an image, the method comprising the steps of: acquiring first image data corresponding to at least one image feature using first sensing means; acquiring second image data corresponding to the at least one image feature using second sensing means; processing one of the first or second image data to identify changes in adjacent data points corresponding to a boundary of the at least one image feature; generating modified first or second image data corresponding to the processed first or second image data; and, combining the modified first or second image data with the unprocessed second or first image data to generate enhanced image data.

The method of the second aspect preferably further comprises generating an enhanced display of the image using the enhanced image data. Preferably, the enhanced image comprises an outline of the at least one image feature corresponding to the modified first or second image data superimposed on the at least one image feature corresponding to the second or first image data, respectively.

The processing of the first or second image data, preferably comprises the application of a filter, and more preferably, a convolution filter to the first or second image data.

In accordance with the present invention as seen from a third aspect there is provided a system for enhancing the visibility of features of an image, the system comprising image sensing means for acquiring image data corresponding to at least one image feature, processing means for processing the image data to generate modified data comprising data corresponding to a boundary of the at least one image feature.

Preferably, the sensing means comprises at least one sensor, such as a camera which is arranged to operate at visible wavelengths and/or a camera which is arranged to operate at other than visible wavelengths, such as infrared and radio wavelengths.

The processing means is preferably arranged to apply a filter to the image data. Preferably, the filter comprises a convolution filter.

Preferably, the system further comprises a display for displaying the modified image corresponding to the modified image data. The display is preferably further arranged display an enhanced image corresponding to the enhanced image data. Preferably, the display comprises a head-up display or a head mounted display.

An embodiment of the present invention will now be described by way of example only and with reference to the accompanying drawings, in which:

FIG. 3a is a typical landscape view of a pilot from a cockpit of an aircraft;

FIG. 3b is a modified image of the landscape view of FIG. 3a;

FIG. 3c is a superposition of FIGS. 3a and 3b, where the black outline of FIG. 3b is illustrated in white for clarity;

FIG. 4a is a simplified thermal image view of a tree and house as viewed on a head-up display;

FIG. 4b is a simplified modified image of tree and house as viewed on a head-up display; and FIG. 4c is a superposition of FIG. 4a and FIG. 4b.

Figure 1:
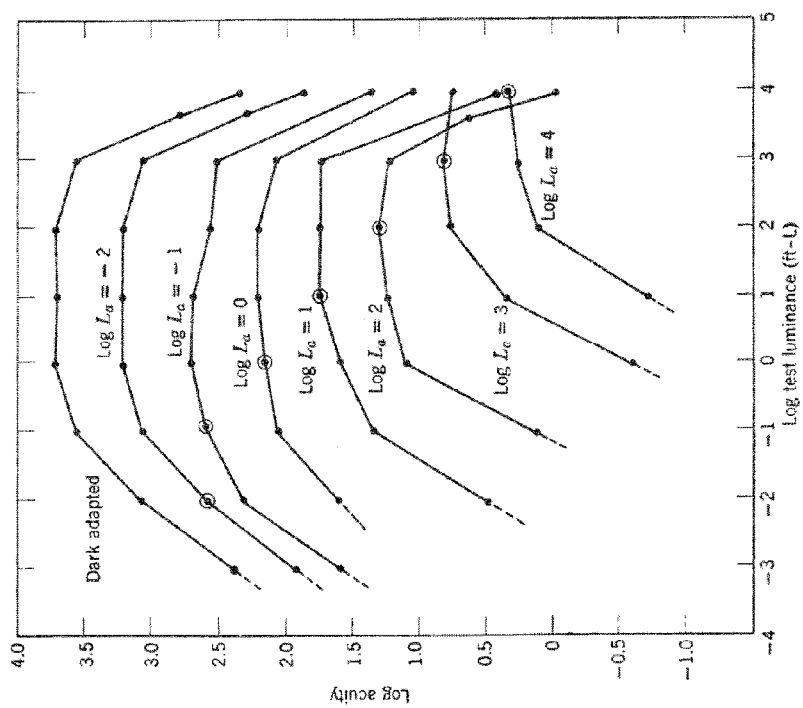
FIG. 1 is a graphical representation of Log (Acuity) against Log (Luminance) at various adapting luminances of the human eye—all curves above the lowest are shifted upward by 0.5 on the ordinate for clarity; and, FIG. 2 is a schematic illustration of a system according to an embodiment of the present invention.
Figure 2:
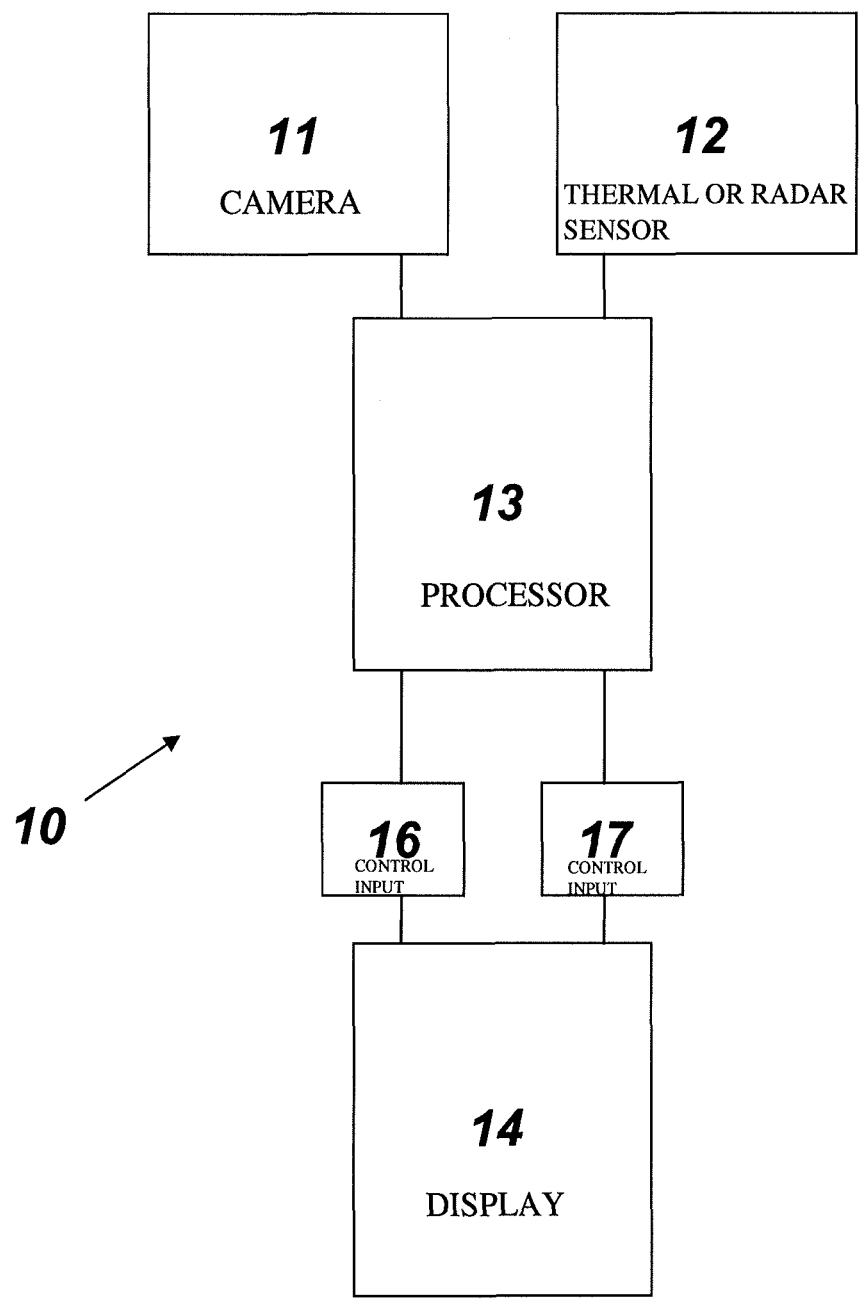

Referring to FIG. 2 of the drawings, there is illustrated a system 10 for enhancing the visibility of an image according to an embodiment of the present invention. The system 10 comprises sensing means, such as a camera 11 operable at visible wavelengths and/or a thermal imaging or radar sensor 12, for example. The camera 11 and sensor 12 are arranged to acquire real time image data, such as a view of the landscape from an aircraft (not shown), and may comprise image data corresponding to a colour image of the landscape, or a greyscale or thermal image of the landscape, for example. The system 10 further comprises a processor 13, which is arranged to apply a convolution filter to the image data from the camera 11 and/or sensor 12 to identify the boundary or edges of the image features in real time. The processor 13 is further arranged to generate modified image data which comprises data relating to the boundary or edges of the image features. It is a requirement that the filter process does not introduce significant delay nor introduce clutter into the data, since this could otherwise lead to the display of erroneous information.

Figure 3:
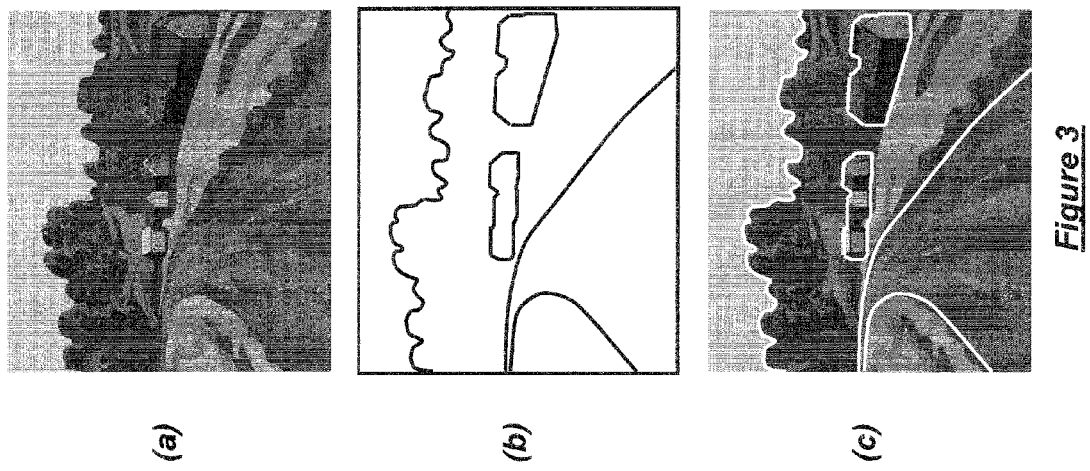

The system 10 further comprises a display unit 14, such as a head-up display or head mounted display, for displaying a modified, outline, image of the view of the landscape according to the modified image data. For example, the pilots view out from a cockpit of an aircraft may be similar to that illustrated in FIG. 3a of the drawings. The display unit 14 is arranged to display the modified image, namely the outline of the landscape features (as illustrated in FIG. 3b of the drawings) as viewed by the pilot, such that the modified image appears superposed over the outside scene (as illustrated in FIG. 3c of the drawings), to render the features of the landscape more discernable. The outline can be made sufficiently bright to overcome a high background luminance, while also minimising any obscuration of the outside view of the aircraft (not shown), for example. Preferably, the luminance of the displayed outline image is generally equal to or greater than the luminance of the real world scene. A sensing unit may be provided for sensing the ambient lighting conditions of the real world scene and adjusting the luminance of the outline image to allow it to be readily seen by a viewer whilst not obscuring the view of the real world scene. If the modified image illustrated the features as solid images however, then clearly the total luminance of the modified image on the display would obscure the outside view and may even be too bright for the viewer (not shown). It will be seen therefore that the display remains generally transparent so that the viewer can clearly view the real world scene whilst also displaying useful information to the viewer concerning the features present in the real world scene.

The display unit 14 may also be arranged to display an enhanced image of the real world scene, which may be the colour image or greyscale thermal image from the camera 11 or sensor 12, for example, as illustrated in FIG. 4a of the drawings, when external luminance levels are low and particularly in the absence of ground features, for example when flying at night or in heavy cloud. The display 14 may display a combination or blend of the modified outline image, as illustrated in FIG. 4b of the drawings and the original enhanced image, such that the modified image and original image become superimposed upon the display 14 as illustrated in FIG. 4c of the drawings. It is envisaged for example, that the modified image alone, namely the outline of the image features, may lack information to sufficiently identify image features or provide perception of range. However, adding some greyscale to fill-in between the outline of the image features by superimposing the modified image with the original greyscale or thermal image, for example, will provide sufficient visual cues to identify the object.

The system 10 further comprises a first and second control input 16, 17 for controlling the relative luminance of the modified image and the greyscale image, for example. It is envisaged that a pilot (not shown) for example, would select the most appropriate relative luminance setting for the prevailing situation. For example, when flying an aircraft above sunlit cloud in high ambient background luminance, it is envisaged that the pilot would select a high luminance modified image (as illustrated in FIG. 3a of the drawings) with the greyscale image switched off, whereas, when flying in cloud in reduced ambient luminance, it is envisaged that the pilot may select a mix of the greyscale image and the modified image (as illustrated in FIG. 3c of the drawings).

The display unit may be a head-up display having a combiner which serves to combine the displayed image superimposed over a real world scene viewed through the combiner. Alternatively, the display unit may not be see through but arranged to display in real time an image of the real world scene derived from one or more of the sensing units, for example a camera. The outline image may be derived from a different sensor, for example a thermal imaging sensor and superimposed on the real world image to provide additional information to a viewer regarding the content of or features in the real world scene.

The outline image may be derived from a sensing unit which is specifically selected for its suitability for edge processing by the processor or because the sensing unit is able to sense features in the real world scene which are not discernible in normal visible light. For example, a thermal image sensor may be used to acquire the required sensory input in low level ambient lighting conditions, or where the features are hidden from normal sight, e.g. because they are behind something opaque to visible light. The enhanced image may be derived from the same sensing unit which provides image data for edge processing or may be derived from a different sensing unit. For example, the outline image may be generated using a radar sensor, whereas the enhanced image may be generated using a thermal sensor.

From the foregoing therefore, it is evident that the method and system of the present invention provides for an increased visibility of image features on a display under various ambient luminance levels.

The invention claimed is:

1. A method of enhancing the visibility of at least one feature of an image superimposed on a real world scene containing said feature, the method comprising:
    acquiring image data of said real world scene including said at least one feature using sensing means;
    processing the image data to identify changes in adjacent data points corresponding to a boundary of the at least one image feature;
    generating modified image data corresponding to the boundary of the at least one image feature;
    displaying in real time an outline image corresponding to the modified image data superimposed on the boundary of said at least one feature in the real world scene; and
    including acquiring image data of said real world scene for generating the outline image using a first sensing means, and acquiring image data of said real world scene for generating the enhanced image using a second different sensing means.

2. A method according to claim 1, wherein the luminance of the outline image is generally equal to or greater than the luminance of the real world scene.

3. A method according to claim 1, further comprising: generating enhanced image data of the at least one feature in the real world scene and displaying an enhanced image of the at least one feature corresponding to the enhanced image data combined with the outline image.

4. A method according to claim 1, wherein the luminance of the outline image is greater than the luminance of the enhanced image.

5. A method according to claim 4, further comprising modifying the luminance of the enhanced image dependent on the luminance of the real world scene.

6. A method according to claim 1, comprising displaying the outline image on a head-up display superimposed on the real world scene viewed through the head-up display.

7. A method according to claim 1, comprising displaying the real world scene on a display with the outline image superimposed on the image of the real world scene.

8. A method according to claim 1, comprising acquiring image data of said real world scene for generating said outline image using sensing means which senses radiation at a wavelength not in the visible spectrum.

9. A system for enhancing the visibility of at least one feature of an image superimposed on a real world scene containing said feature, the system comprising image sensing means for acquiring image data corresponding to the at least one image feature, processing means for processing the image data to generate modified data comprising data corresponding to a boundary of the at least one image feature, and a display for displaying in real time an outline image corresponding to the modified image data superimposed on the boundary of the at least one image feature, wherein a first sensing means acquires image data of said real world scene for generating the outline image, and a second different sensing means acquires image data of said real world scene for generating the enhanced image.

10. A system according to claim 9, wherein the display is configured to display the outline image at a luminance which is generally equal to or greater than the luminance of the real world scene.

11. A system according to claim 10, comprising sensing means for sensing the luminance of the real world scene and adjusting the luminance of the outline image in response thereto.

12. A system according to claim 9, wherein said sensing means is configured for generating enhanced image data of the at least one feature in the real world scene for displaying on said display an enhanced image of the at least one feature corresponding to the enhanced image data combined with the outline image.

13. A system according to claim 12, wherein the luminance of the outline image displayed is greater than the luminance of the enhanced image displayed.

14. A system according to claim 12, further comprising means operable by a viewer for modifying the luminance of the enhanced image and/or the outline image according to the luminance of the real world scene.

15. A system according to claim 9, comprising a head-up display configured for displaying the outline image superimposed on the real world scene viewed through the head-up display.

16. A system according to claim 9, wherein the display is configured for displaying the real world scene with the outline image superimposed on the image of the real world scene.

17. A system according to claim 9, comprising sensing means for sensing radiation at a wavelength not in the visible spectrum for acquiring image data of said real world scene for generating said outline image.

* * * * *